(12) United States Patent
Makita et al.

(10) Patent No.: US 10,293,670 B2
(45) Date of Patent: May 21, 2019

(54) VEHICLE MOLDING

(71) Applicant: SHIROKI CORPORATION, Fujisawa-shi, Kanagawa (JP)

(72) Inventors: Jun Makita, Fujisawa (JP); Takanori Suzuki, Fujisawa (JP)

(73) Assignee: SHIROKI CORPORATION, Fujisawa-Shi, Kanagawa (JP)

(*) Notice: Subject to any disclaimer, the term of this patent is extended or adjusted under 35 U.S.C. 154(b) by 311 days.

(21) Appl. No.: 15/127,131

(22) PCT Filed: Mar. 27, 2015

(86) PCT No.: PCT/JP2015/059718
§ 371 (c)(1),
(2) Date: Sep. 19, 2016

(87) PCT Pub. No.: WO2015/152071
PCT Pub. Date: Oct. 8, 2015

(65) Prior Publication Data
US 2018/0170161 A1  Jun. 21, 2018

(30) Foreign Application Priority Data

Apr. 1, 2014 (JP) ................................. 2014-075425

(51) Int. Cl.
*B60J 10/33* (2016.01)
*B60R 13/04* (2006.01)
(Continued)

(52) U.S. Cl.
CPC ............... *B60J 10/33* (2016.02); *B60J 10/75* (2016.02); *B60R 13/04* (2013.01); *F16B 5/121* (2013.01);
(Continued)

(58) Field of Classification Search
CPC . B60J 10/33; B60J 10/75; B60R 13/04; F16B 5/121
(Continued)

(56) References Cited

U.S. PATENT DOCUMENTS 6,742,304 B1* 6/2004 Mueller ................. B60J 10/265
49/377
2013/0277516 A1  10/2013 Patterson et al.
2014/0183901 A1* 7/2014 Jun ......................... B60R 13/04
296/146.2

FOREIGN PATENT DOCUMENTS

JP   H07-018945 U   4/1995
JP   8-072548 A     3/1996
(Continued)

OTHER PUBLICATIONS

International Search Report (PCT/ISA/210) dated Jun. 9, 2015, by the Japanese Patent Office as the International Searching Authority for International Application No. PCT/JP2015/059718.
(Continued)

*Primary Examiner* — Joseph D. Pape
(74) *Attorney, Agent, or Firm* — Buchanan Ingersoll & Rooney PC

(57) ABSTRACT

In a vehicle molding attached to a vehicle body part, a clip, to attach a molding body onto a body-part edge portion, is provided with an insertion part, into which the body-part edge portion is inserted; an engaging portion configured to engage with an engagement-receiving portion, provided on the body-part edge portion in a state where the edge portion is inserted into the insertion part, whereby a relative movement is restricted in a removal direction; and a biaser which elastically deforms upon abutting against the body-part edge portion that is inserted into the insertion part, the biaser applying a force that engages the engaging portion with the engagement-receiving portion by a restorative force of the
(Continued)

elastic deformation of the biaser. Accordingly, the vehicle molding can be securely and reliably attached at a proper position while having a simple structure.

9 Claims, 8 Drawing Sheets

(51) Int. Cl.
*F16B 5/12* (2006.01)
*B60J 10/75* (2016.01)
*B60J 10/36* (2016.01)
*B60J 10/84* (2016.01)
*F16B 5/06* (2006.01)

(52) U.S. Cl.
CPC ............... *B60J 10/36* (2016.02); *B60J 10/85* (2016.02); *F16B 5/0664* (2013.01)

(58) Field of Classification Search
USPC ..................................................... 296/146.2
See application file for complete search history.

(56) References Cited

FOREIGN PATENT DOCUMENTS

| | | |
|---|---|---|
| JP | 2003-118386 A | 4/2003 |
| JP | 2013-154747 A | 8/2003 |
| JP | 2005-254915 A | 9/2005 |
| JP | 2007-062399 A | 3/2007 |
| JP | 2009-196391 A | 9/2009 |

OTHER PUBLICATIONS

Written Opinion (PCT/ISA/237) dated Jun. 9, 2015, by the Japanese Patent Office as the International Searching Authority for International Application No. PCT/JP2015/059718.

Office Action (Notification of Reasons for Refusal) dated Feb. 6, 2018, by the Japanese Patent Office in corresponding Japanese Patent Application No. 2014-075425, and an English Translation of the Office Action. (7 pages).

\* cited by examiner

VEHICLE MOLDING

TECHNICAL FIELD

The present invention relates to a molding which is attached to an edge portion of a vehicle door or a vehicle body.

BACKGROUND ART

It is common for various types of trim moldings to be attached to an edge of a vehicle exterior component (hereinafter referred to as a body part) of a vehicle. For example, a belt molding attached to a door panel edge, a sash molding attached to an edge of door frame (door sash), and a roof molding attached to an edge of a vehicle body roof panel, etc., are known. If the fixing position of such moldings are displaced, since this becomes a cause of wind noise and affects the appearance, countermeasures have been taken in order to attach the molding at the proper position.

CITATION LIST

Patent Literature

Patent Literature No. 1: Japanese Unexamined Patent Publication No. H08-72548
Patent Literature No. 2: Japanese Unexamined Patent Publication No. 2013-154747

SUMMARY OF THE INVENTION

Technical Problem

A molding structure, in which clips are provided on a molding body and an edge portion of a body part is inserted into an insertion opening formed on each clip with both sides of the edge portion of the body part clasped by the clips, is often employed. Countermeasures for preventing positional displacement and shaking of the clips in the clasping direction (in the thickness direction of the body part edge portion) have been conventionally carried out (e.g., Patent Literature No. 1).

The body part edge portion and each clip are provided with an engagement-receiving portion and an engaging portion which restrict relative movement in the insertion direction and in there reverse direction thereto (hereinafter referred to as the pulling-out direction) in a state where the edge portion is inserted into the clip(s). The position of the molding, including the clips, in the insertion direction is determined based on a retaining engagement position, or more precisely, is based on the engagement-receiving portion on the body part edge portion. Therefore, there is a demand for the retaining engagement-receiving portion and the engaging portion to be securely and reliably engaged when the molding is attached. However, as long as a tolerance in the insertion direction is provided in the clips in consideration of discrepancies in component precision, there has been a possibility of the edge portion of the body part inserting deeper into the clips than the proper position. Accordingly, the engagement-receiving portion and the engaging portion do not engage with each other and remain spaced apart so that a positional displacement occurs in the insertion direction. Positional displacement can be prevented if the molding is aligned and welded, etc., after being attached, however, the number of man-hours increases, and there is a disadvantage in regard to productivity and cost.

An objective of the present invention is to provide a vehicle molding having a simple structure and that can be securely and reliably attached at a proper position.

Solution to Problem

The present invention has the following configuration in regard to a vehicle molding which is attached to an edge portion of a body part of a vehicle. A vehicle molding is provided, which is attached along an edge portion of a body part via a clip which is provided on a molding body, wherein the clip includes an insertion part, into which the edge portion of the body part is inserted; an engaging portion configured to engage with an engagement-receiving portion which is provided on the edge portion of the body part in a state where the edge portion of the body part is inserted into the insertion part, whereby a relative movement is restricted in a removal direction; and a biaser which elastically deforms upon abutting against the edge portion of the body part that is inserted into the insertion part, the biaser applying a force that engages the engaging portion with the engagement-receiving portion by a restorative force of the elastic deformation of the biaser.

It is desirable for the biaser to be a cantilever shaped leaf spring which projects into the insertion part of the clip. More specifically, the insertion part of the clip includes a pair of opposing portions, by which both sides of the edge portion of the body part are sandwiched; and a connecting portion which connects the pair of opposing portions and opposes an end of the edge portion of the body part, wherein the engaging portion is continuously formed on one of the pair of opposing portions. A base end of the biaser is connected to the connecting portion and a free end of the biaser is positioned in between the pair of opposing portions. The biaser is elastically deformable in directions such that a position of the free end approaches and moves away from the connecting portion.

It is desirable for a gap to be formed between the connecting portion of the clip and the edge portion of the body part in a state where the engaging portion is engaged with the engagement-receiving portion. Due to this gap, variation in the insertion amount of the edge portion of the body part into the clip insertion portion can be absorbed while positional displacement of the molding due to the gap being provided can be prevented by the biaser.

The biaser can have a cross-sectional shape which is inclined relative to a width direction of the clip from one to the other of the pair of opposing portions.

The present invention can be applied to various vehicle moldings, for example, the body part can be a door panel of a vehicle door, wherein the molding body is attached to an edge portion of the door panel. More specifically, it is effective for the vehicle molding to include a frame molding including a first molding section which is connected with a sash molding attached to a door frame of a vehicle door, a second molding section connected with a belt molding attached to the edge portion of the door panel, and a corner portion at which the first molding section and the second molding section meet. It is effective that the clip is provided on the second molding section.

Advantageous Effects of the Invention

According to the vehicle molding of the present invention, due to the simple configuration of providing a biaser in the clip, the engaging portion of the clip can be securely and reliably engaged with the engagement-receiving portion of an end portion of a body part, so that the vehicle molding can have a simple structure and be securely and reliably attached at a proper position.

DESCRIPTION OF EMBODIMENTS

Figure 1:
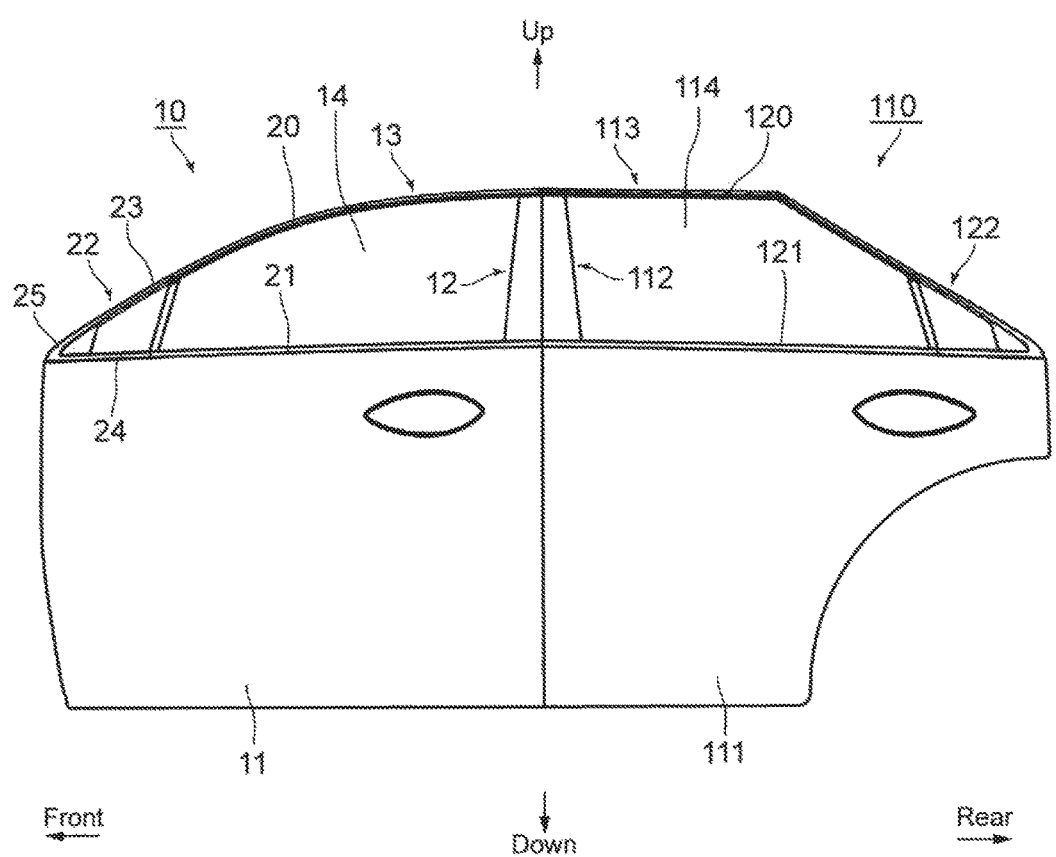
FIG. 1 is a side elevational view of a vehicle front door and a rear door which are each provided with a frame molding, to which the present invention is applied.

FIG. 1 shows a front side door 10 and a rear side door 110 of an automobile, to which a molding of the present invention is attached. The direction terms "front", "rear", "upper", "lower", "vehicle inner side" and "vehicle outer side" in the following descriptions refer to directions based on the body of the automobile, to which the front side door 10 and the rear side door 110 are attached.

Figure 3:
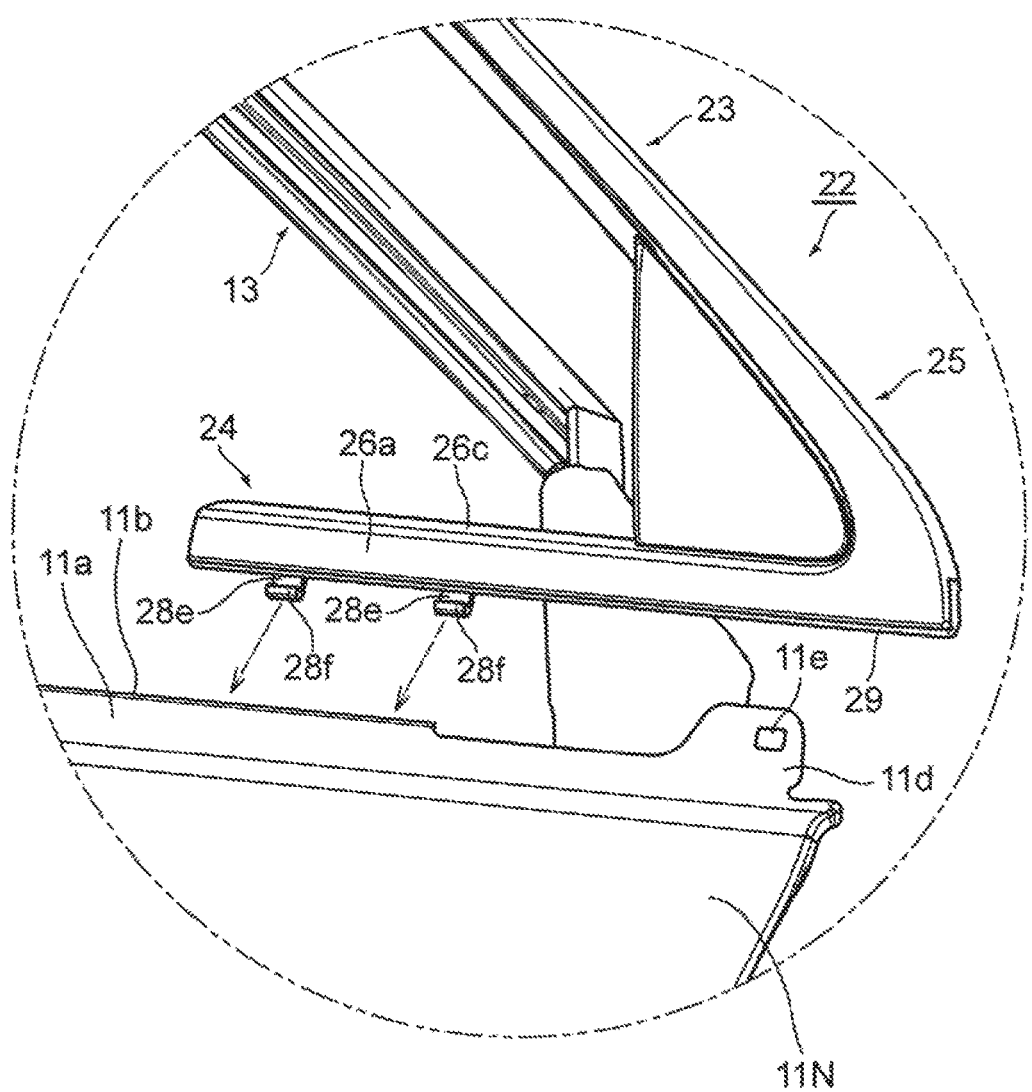
FIG. 3 is a perspective view of the front frame molding during attaching thereof to the front side door, as viewed from a vehicle outer side.

The front side door 10 has a construction in which a frame-shaped door frame (door sash) is provided on top of a door panel 11. The door frame is provided with a vertically extending rear side frame 12 supported at a rear portion of the door panel 11, and an upper frame 13 which extends forwardly from an upper end of the rear side frame 12. A door glass (omitted from the drawings) is movable in the upward and downward directions within a window opening 14, which is surrounded by an upper edge portion of the door panel 11, the rear side frame 12 and the upper frame 13. The door panel 11 is configured of a combination of an inner panel positioned on the vehicle inner side and an outer panel (vehicle body part) 11N (partly shown in FIG. 3, shown by phantom lines in FIGS. 6 through 8) positioned at the vehicle outer side.

As a trimming member for the front side door 10, an upper sash molding 20 is attached along the upper frame 13, and a belt molding 21 is attached along the upper edge portion of the door panel 11. Furthermore, a front frame molding 22 which connects the upper sash molding 20 and the belt molding 21 to each other is attached to a front-end corner portion of the door sash.

The rear side door 110 is configured to be approximately in forward-to-rearward symmetry with the front side door 10. In other words, the rear side door 110 is provided with a vertically extending front side frame 112 which is supported by a front portion of a door panel 111, and an upper frame 113 which extends rearwardly from the top end of the front side frame 112. A door glass (omitted from the drawings) is movable in the upward and downward directions within a window opening 114, which is surrounded by an upper edge portion of the door panel 111, the front side frame 112 and the upper frame 113. The door panel 111 is configured of a combination of an inner panel positioned on the vehicle inner side and an outer panel outer panel positioned at the vehicle outer side.

As a trimming member for the rear side door 110, an upper sash molding 120 is attached along the upper frame 113, and a belt molding 121 is attached along the upper edge portion of the door panel 111. Furthermore, a rear frame molding 122 which connects the upper sash molding 120 and the belt molding 121 to each other is attached to a rear-end corner portion of the door sash.

Details of the front frame molding 22 of the front side door 10 will be described hereinbelow. Note that the following descriptions are also relevant to the rear frame molding 122 of the rear side door 110 of the front/rear relationship thereof is reversed. Namely, the present invention is not limited to attaching the molding on the front side door 10, but can also be applied to the molding attached to the rear side door 110.

Figure 2:
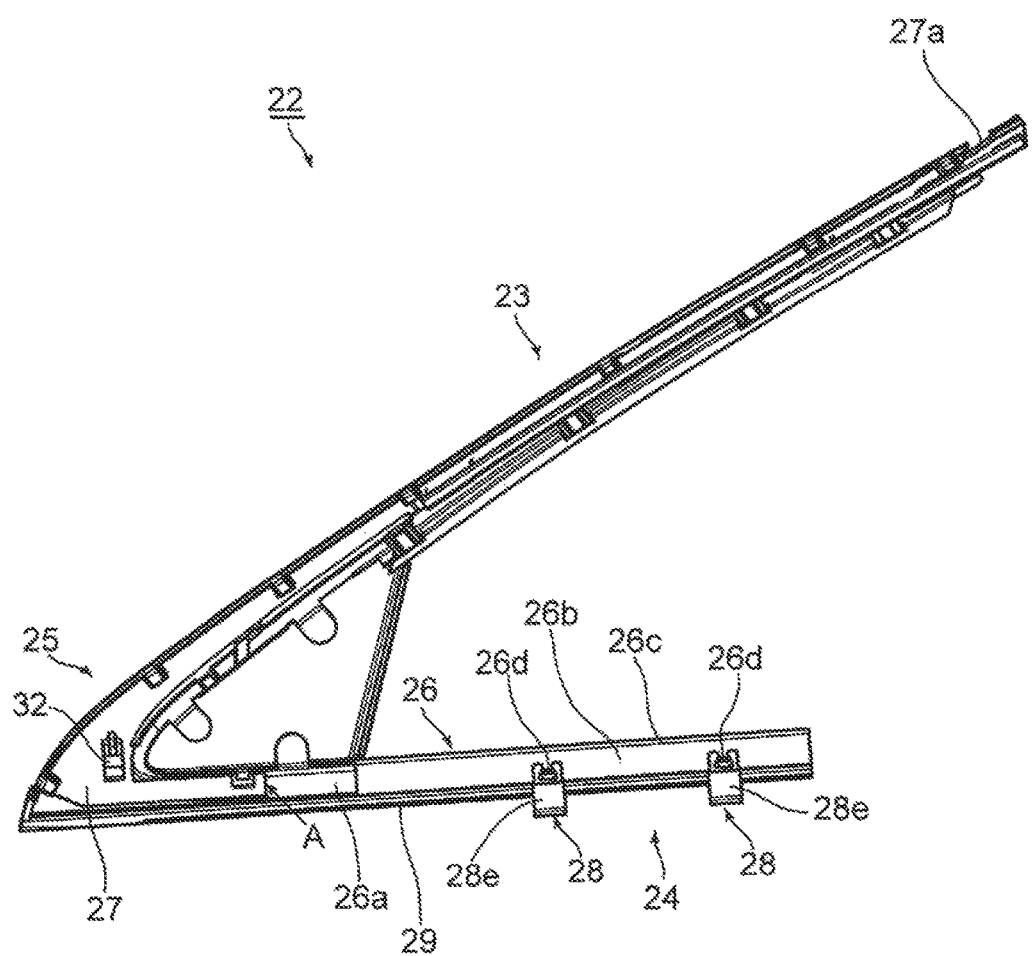
FIG. 2 is a perspective view of a front frame molding attached to a front side door, as viewed from a vehicle inner side.

As shown in FIG. 2, the front frame molding 22 has a V-shape configured of a first molding section 23 having a shape that continues from the upper sash molding 20, a second molding section 24 having a shape that continues from the belt molding 21, and a corner portion 25, at which the first molding section 23 and the second molding section 24 meet; and these sections are combined with a design member 26 and a holder member 27 to constitute a molding body part. In the second molding section 24, a pair of clips 28 are attached to the design member 26. The pair of clips 28 are arranged at a predetermined interval along the lengthwise direction of the second molding section 24.

The design member 26 is a press-formed metal member, such as stainless steel, etc., formed from one end of the first molding section 23 to one end of the second molding section 24, over the entire front frame molding 22. Although the cross-sectional shape of the design member 26 differs along the front frame molding 22, the fundamental structure of the design member 26 is configured of, as shown in FIGS. 3, 6 and 7, an exterior part formed by a design portion 26a on the vehicle exterior side; and as shown in FIG. 2, the holder member 27 and the clips 28 are attached to the vehicle inner side of the design portion 26a.

Figure 4:
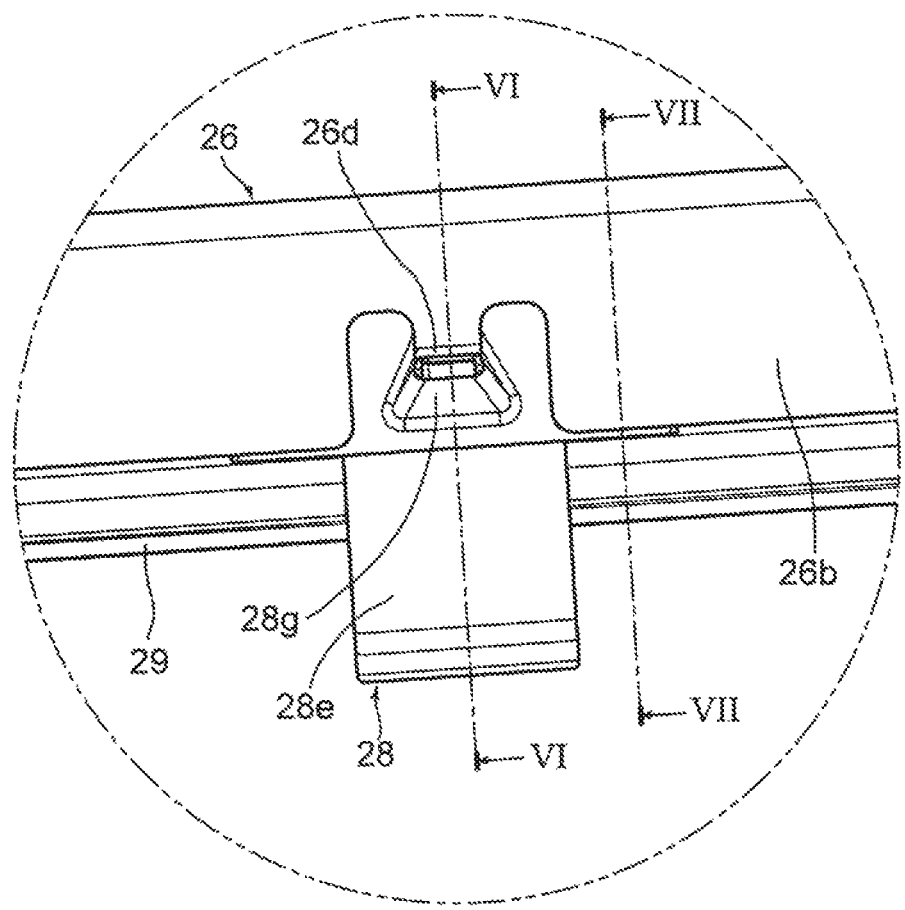
FIG. 4 is a view from the vehicle inner side of a clip of the front frame molding.
Figure 6:
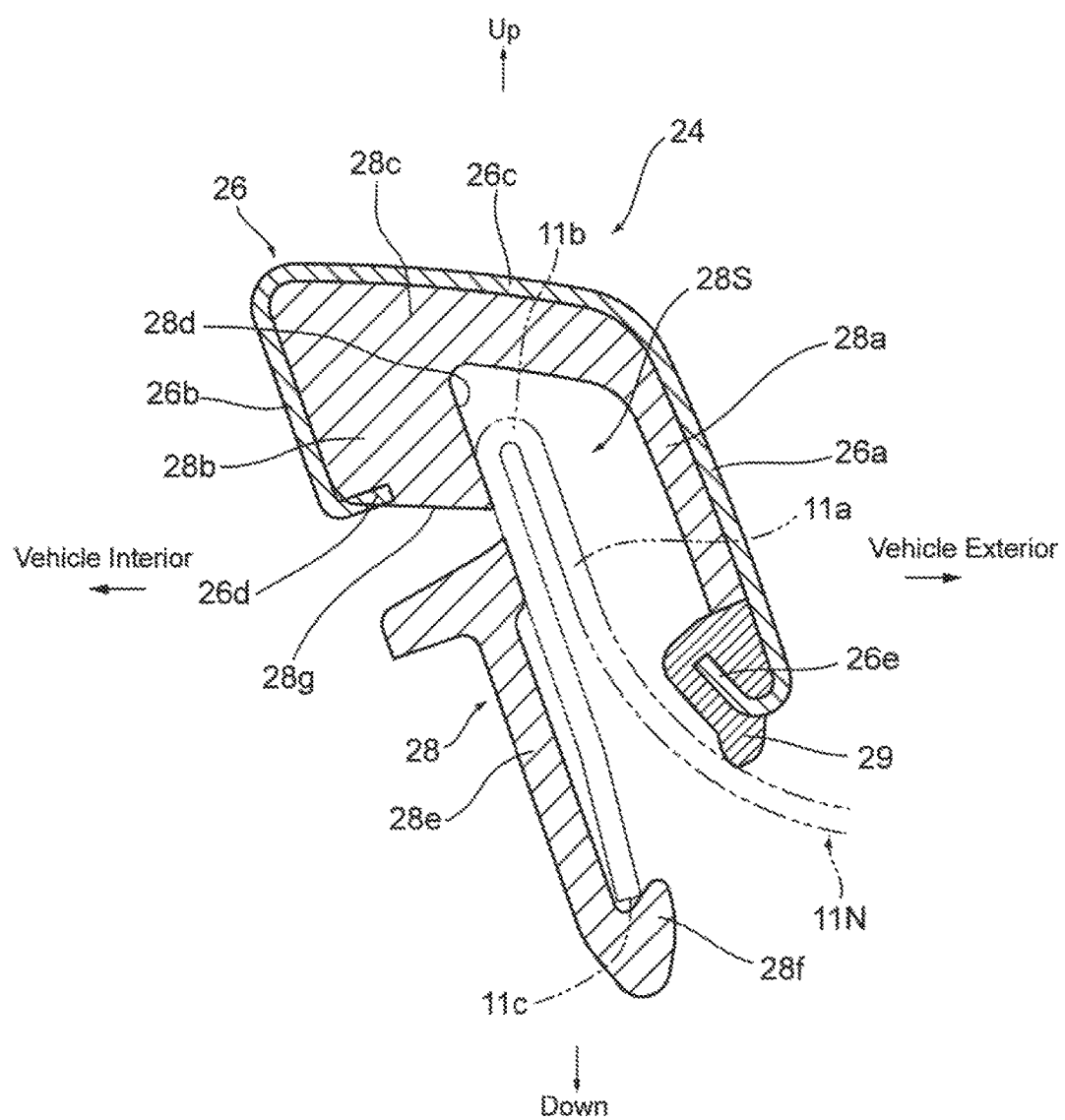
FIG. 6 is a cross-sectional view taken along the VI-VI line in FIG. 4.
Figure 7:
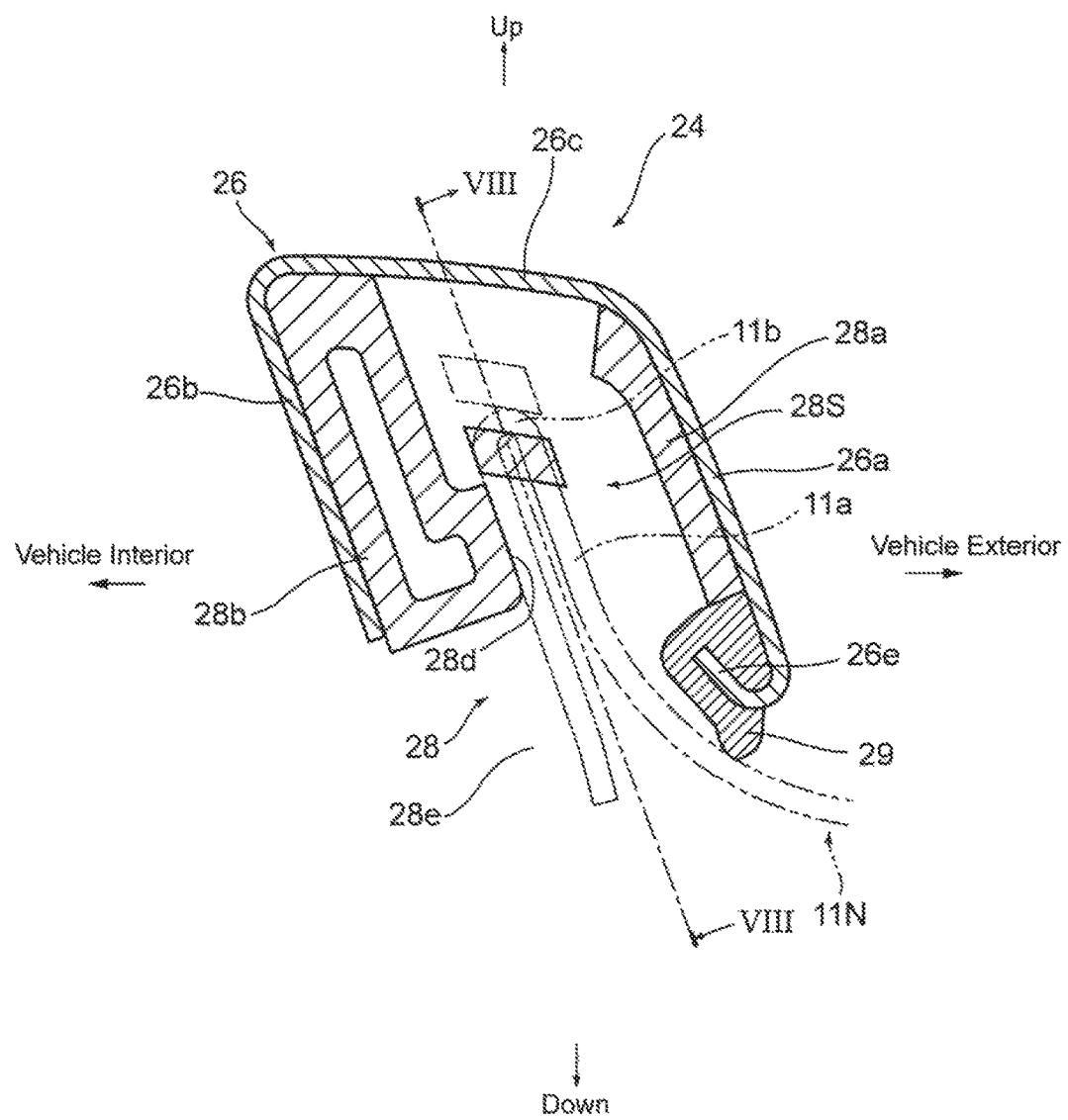
FIG. 7 is a cross-sectional view taken along the VII-VII line in FIG. 4.

As shown in FIG. 6 and FIG. 7, out of the second molding section 24, the portions of the design member 26 at which the pair of clips 28 are attached include the design portion 26a, a vehicle-inner-side portion 26b which is positioned facing the vehicle inner side with respect to the design portion 26a, and a connecting portion 26c which connects the upper edges of the design portion 26a and the vehicle-inner-side portion 26b. The design portion 26a, the vehicle-inner-side portion 26b and the connecting portion 26c form a reversed U-shaped cross-section having a downward opening. As shown in FIGS. 2, 4 and 6, retainer claws 26d, which are formed by bending part of the vehicle-inner-side portion 26b toward the vehicle outer side, are provided at positions respectively corresponding to the pair of clips 28 in the lengthwise direction of the second molding section 24. Furthermore, a lip support 26e is provided over the entirety of the second molding section 24 while protruding toward the vehicle inner side from the lower edge of the design portion 26a. A body-touch lip 29 is provided along the lip support 26e. The body-touch lip 29 is formed from an elastically deformable material and functions as a seal that comes in contact with the outer panel 11N of the door panel 11 when the front frame molding 22 is attached to the door panel 11.

The holder member 27 has a length from the end of the first molding section 23 until partway (at the position A in FIG. 2) along the second molding section 24 via the corner portion 25; and includes a weather strip retainer 27a (FIG. 2) along the first molding section 23 for retaining a weather strip (not shown). The weather strip is provided with an elastic contact projecting in an outer peripheral direction of the door frame, and when the front side door 10 is closed, the elastic contact of the weather strip comes in contact with the vehicle body, thereby preventing water droplets, etc., from penetrating inside the vehicle. The holder member 27 is supported along the vehicle inner side of the design portion 26a of the design member 26 at the portion of the second molding section 24 that is close to the corner portion 25 (the region left of position A in FIG. 2). Hence, by extending the holder member 27 until a midway position along the second molding section 24, the strength around the corner portion 25 of the front frame molding 22 can be improved. The holder member 27 does not exist at the portions (the region to the right of position A in FIG. 2) of the second molding section 24 at which the pair of clips 28 are provided.

The clips 28 are formed from a compound resin, and as shown in FIG. 4 onwards, each have a shape that fits into the reverse U-shaped design member 26. More specifically, each clip 28 has a reversed U-shaped cross section configured of a vehicle-outer-side portion (opposing portion) 28a positioned along the vehicle inner-side surface of the design portion 26a, a vehicle-inner-side portion (opposing portion) 28b positioned along the vehicle outer-side surface of the vehicle-inner-side portion 26b, and a connecting portion 28c positioned along the undersurface of the connecting portion 26c; the vehicle-outer-side portion 28a, the vehicle-inner-side portion 28b and the connecting portion 28c form a downward facing insertion part 28S. A planar abutting portion 28d, which faces the vehicle outer side, is formed on the vehicle-inner-side portion 28b, and a downward-extending portion 28e is provided on the abutting portion 28d to project downwardly therefrom. A claw-shaped engaging portion 28f is formed at the end of the downward-extending portion 28e and is bent toward the vehicle outer side. An engagement hole 28g is formed in the vehicle-inner-side portion 28b and opened toward the vehicle inner side; by engaging the retainer claws 26d of the design member 26 into this engagement hole 28g (see FIGS. 4 and 6), each clip 28 is fitted into and retained in the design member 26, as shown in FIGS. 6 and 7.

Figure 5:
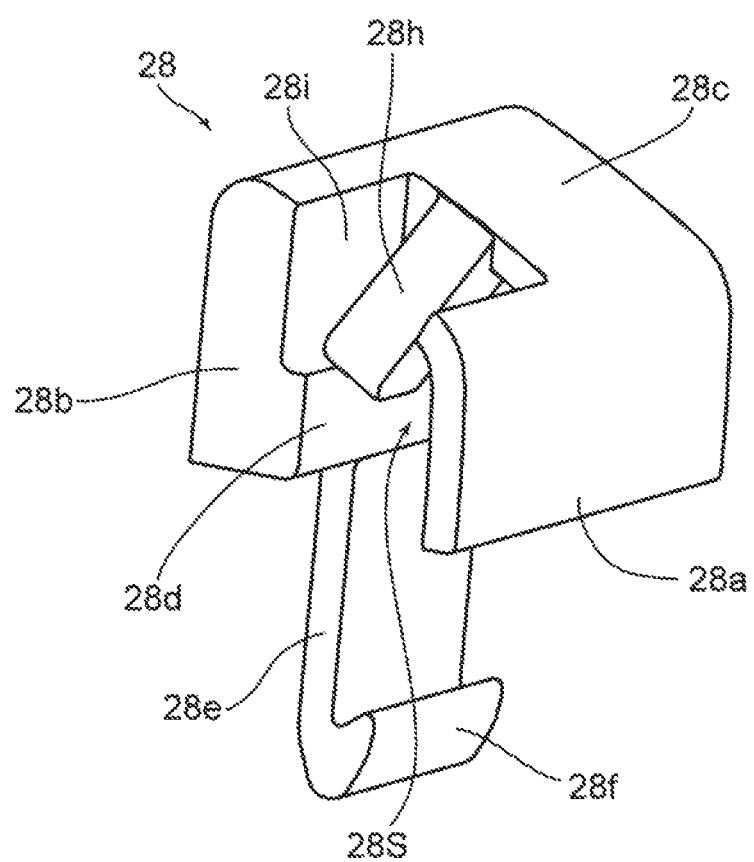
FIG. 5 is a perspective view of a single unit of the clip.
Figure 8:
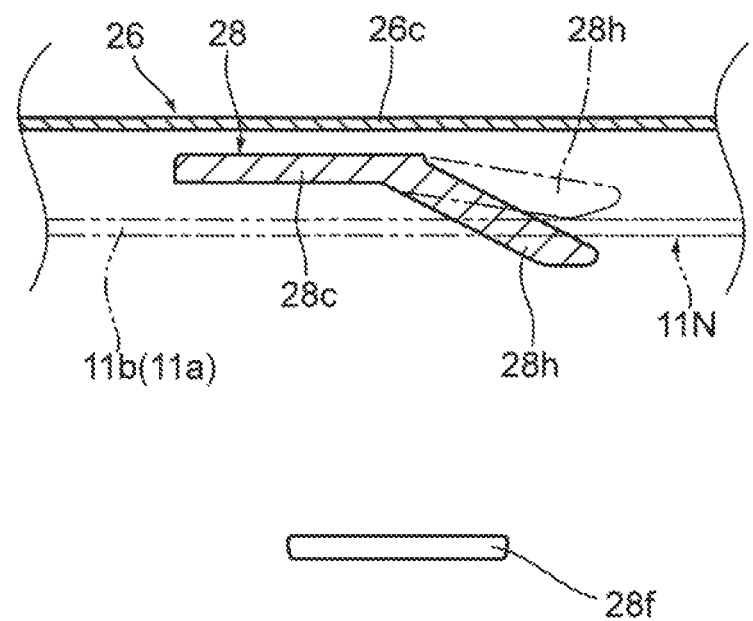
FIG. 8 is a cross-sectional view taken along the VIII-VIII line in FIG. 7.

Each clip 28 is further provided with a biaser 28h which projects into the insertion part 28S. A recess 28i (FIG. 5) is formed by cutting out a part of the connecting portion 28c and the vehicle-inner-side portion 28b. As shown in FIGS. 5, 7 and 8, the biaser 28h is formed as a cantilever leaf spring (projection) provided from a position facing the recess 28i of the connecting portion 28c and projecting along the lengthwise direction of the second molding section 24. The biaser 28h is inclined downwardly from a base portion that is connected to the connecting portion 28c toward a distal end at the free end thereof, and is elastically deformable to change the position of the distal end (free end) thereof, with the base portion as a fulcrum, in a direction to approach the connecting portion 28c and in a direction away from the connecting portion 28c. With respect to the lengthwise direction of the second molding section 24, the base portion of the biaser 28h is provided at an approximately central position of the clip 28, and the distal end of the biaser 28h is positioned close to one end (the end visible in FIG. 5) of the clip 28.

As shown in FIG. 7, with respect to a width direction defined by direction along a minimum distance between the mutually facing vehicle-outer-side portion 28a and the vehicle-inner-side portion 28b, the biaser 28h has an inclined cross-sectional shape with respect to the width direction of the clip 28. More specifically, the biaser 28h has a parallelogram cross-sectional shape that is inclined from an upward to a downward direction from the vehicle inner side to the vehicle outer side.

As shown in FIG. 3, a flange (edge portion of the body part) 11a is formed on the upper edge of the outer panel 11N. As shown in FIGS. 6 and 7, the flange 11a has a folded-back shape which folds back an edge portion of a metal sheet, which forms the outer panel 11N, from the vehicle outer side toward the vehicle inner side; this folded back portion constitutes an upper side 11b of the outer panel 11N. An engagement-receiving portion 11c is formed by the distal end (lower end) of the folded back (toward the vehicle inner side) portion that extends downwardly from the upper side 11b at positions along the lengthwise direction of the flange 11a corresponding to the engaging portion 28f of each of the pair of clips 28 of the front frame molding 22 (FIG. 6).

When attaching the front frame molding 22 onto the door panel 11, as shown in FIG. 3, the downward-facing open portion (the opening portion between the design portion 26a and the vehicle-inner-side portion 26b) of the second molding section 24 is brought close to the flange 11a of the upper edge of the outer panel 11N. Thereupon, as shown in FIGS. 6 and 7, the flange 11a is inserted in between the design portion 26a and the vehicle-inner-side portion 26b, and the flange 11a enters into each insertion part 28S (between the vehicle-outer-side portion 28a and the vehicle-inner-side portion 28b) at the portions where the pair of clips 28 are provided. The downward-extending portion 28e is elastically deformable in the width direction (in a direction approaching or moving away from the vehicle-outer-side portion 28a) of the clip 28, so that when the flange 11a is inserted into the insertion part 28S of the clip 28, the downward-extending portion 28e is depressed while elastically deforming toward the vehicle inner side. Upon the flange 11a being inserted up to the position shown in FIG. 6, the downward-extending portion 28e returns in a direction that releases the elastic deformation thereof, and the engaging portion 28f engages with the engagement-receiving portion 11c in the flange 11a. Due to this engagement, the clip 28 (the second molding section 24) enters a retaining state in which upward movement thereof relative to the door panel 11 is restricted. In other words, the engagement-receiving portion 11c of the outer panel 11N becomes a positional reference surface with respect to the upward/downward direction of the front frame molding 22, in the assembled state thereof. As shown in FIG. 6, in a state where the engagement-receiving portion 11c is engaged with the engaging portion 28f, a gap is formed between the connecting portion 28c of the clip 28 and the upper edge of the flange 11a. Due to this gap, variation in the insertion amount of the flange 11a into the insertion part 28S of the clip 28 can be absorbed. In addition, the abutting portion 28d abuts against the flange 11a from the vehicle inner side, and the body-touch lip 29 abuts against the surface on the vehicle outer side of the outer panel 11N, so that the position of the second molding section 24 (front frame molding 22) in the vehicle-inner-side direction and vehicle-outer-side direction is determined by both sides of the flange 11a being sandwiched therein.

The front frame molding 22 is further provided on the corner portion 25 with an engagement portion which engages with the door panel 11. As shown in FIG. 3, a plate-shaped support flange 11d which projects upward is formed near the front end of the upper edge of the outer panel 11N, and an engagement hole 11e, which penetrates from the vehicle outer side to the vehicle inner side, is formed through the support flange 11d. The support flange 11d has a larger upward projecting amount than that of the above-described flange 11a, and is offset toward the vehicle inner side relative to the flange 11a. In a state where the front frame molding 22 is attached to the door panel 11, the support flange 11d is positioned along the vehicle inner side of the corner portion 25. The holder member 27 of the front frame molding 22 is provided with an engagement hook 32 which is formed on a vehicle-inner-side surface of the corner portion 25. The engagement hook 32 is a claw-shaped part that is similar to the downward-extending portion 28e and the engaging portion 28f part of the clip 28. When the front frame molding 22 is attached to the door panel 11, the support flange 11d is brought close to the claw-shaped engagement hook 32 and the engagement hook 32 engages with the engagement hole 11e. Due to this engagement, the engagement hook 32 enters a retaining state in which the upward movement of the engagement hook 32 (corner portion 25) relative to the door panel 11 is restricted.

The end of the second molding section 24 of the front frame molding 22 is connected to the front end of the belt molding 21 via a molded bracket (not shown in the drawings). Furthermore, in the front frame molding 22, the first molding section 23 is attached to the upper frame 13 and the end of the bending-control lever 23 is also connected to a front end portion of the upper sash molding 20; however, the details thereof are omitted.

As described above, the second molding section 24 of the front frame molding 22 is attached to the door panel 11 via the pair of clips 28, and the corner portion 25 of the front frame molding 22 is supported by the door panel 11 via the engagement hook 32. As described above, since the position of the front frame molding 22 in the upward/downward direction is determined based on the engagement-receiving portion 11c (FIG. 6) of the outer panel 11N, in a state where the front frame molding 22 is attached to the outer panel 11N, the engaging portion 28f of each clip 28 is required to be reliably abutted against the engagement-receiving portion 11c, as shown in FIG. 6. As can be understood from FIG. 6, an allowance in the depth direction is provided in the insertion part 28S of each clip 28 so that the front frame molding 22 can be securely and reliably attached even if a certain amount of precision error exists (a gap is secured between the connecting portion 28c and the upper edge of the flange 11a); otherwise, if no particular countermeasure is taken, there is a possibility of the position of the engaging portion 28f dropping below the engagement-receiving portion 11c. Subsequently, the second molding section 24 of the front frame molding 22 is assembled onto the outer panel 11N at an offset position below the appropriate position, and hence, there is a risk of an unevenness occurring between the second molding section 24 and the belt molding 21. Furthermore, in a state where the second molding section 24 is not attached at the appropriate position, there is a risk of the stability of the contacting state of the body-touch lip 29 against the outer panel 11N being lost.

Each clip 28, which is provided with the biaser 28h, can prevent variations in the attaching position of the front frame molding 22. As shown in FIGS. 7 and 8, the biaser 28h is positioned on an extension of the insertion direction of the flange 11a into the insertion part 28S when the front frame molding 22 is being attached to the outer panel 11N. The solid lines shown in FIGS. 7 and 8 indicate the biaser 28h in a free state. Upon the flange 11a entering into the insertion part 28S while the front frame molding 22 is being attached on the outer panel 11N, the upper side 11b of the flange 11a abuts against the biaser 28h. At the initial stage of this abutment, the engaging portion 28f of each clip 28 and the engagement-receiving portion 11c of the outer panel 11N are not engaged with each other, the flange 11a pushes into the biaser 28h with the upper side 11b and further advances into (in a direction approaching the connecting portion 28c) the clip 28 while elastically deforming. The biaser 28h is shown as a single-dot chain line in FIGS. 7 and 8 at which the engaging portion 28f and the engagement-receiving portion 11c has reached the engagement state of FIG. 6. At this stage, the biaser 28h is elastically deformed upward from the free state thereof, and a restorative force that tries to release the deformed state of the biaser 28h acts as a force that tries to pull the clip 28 upward with the upper side 11b of the flange 11a acting as a fulcrum. Accordingly, the engaging portion 28f can be securely and reliably engaged against the engagement-receiving portion 11c of the outer panel 11N, and a downward positional deviation of the second molding section 24 can be prevented. As a result, the entire front frame molding 22 including the clips 28 can be securely and reliably held against the outer panel 11N at the appropriate attaching position, in the upward/downward direction, based on the engagement-receiving portion 11c. By attaching the front frame molding 22 at the appropriate position, unevenness between the second molding section 24 and the belt molding 21 is prevented and can be aesthetically improved. In addition, the entire body-touch lip 29 can stably abut against the outer panel 11N, and thereby prevent wind noise occurring between the front frame molding 22 and the door panel 11 and prevent deterioration of the sealability therebetween. These effects can be obtained by providing the biaser 28h, which has a simple structure, in each clip 28. Furthermore, there is no need to carry out a separate welding operation when attaching the front frame molding 22, therefore having a superior effect in regard to productivity and manufacturing cost.

The force applied by the biaser 28h does not hinder the ease of installation when attaching the front frame molding 22, and enables the engaging portion 28f to securely and reliably engage with the engagement-receiving portion 11c to thereby prevent positional deviation of the front frame molding 22. If the biasing force of the biaser 28h is increased, the engagement between the engagement-receiving portion 11c and the engaging portion 28f can be further stabilized. However, if the biasing force is too excessive, the load for when the flange 11a is inserted into the insertion part 28S of the pair of clips 28 becomes large and it becomes difficult to attach the front frame molding 22; therefore, it is desirable to set the biasing force to an appropriate amount. The biasing force of the biaser 28h can be determined in accordance with the shape and size of the biaser 28h, the deformation amount of the biaser 28h from the free state thereof, and the material, etc., of the clip 28.

As described above, the biaser 28h of each clip 28 has an inclined cross-sectional shape relative to the width direction from the vehicle-outer-side portion 28a to the vehicle-inner-side portion 28b of the clip 28 (FIG. 7). The insertion of the flange 11a into the insertion part 28S is carried out in a direction that is substantially perpendicular to the width direction of the clip 28. Accordingly, when the upper side 11b presses against the biaser 28h upon insertion of the flange 11a into the insertion part 28S, due to the inclined shape of the biaser 28h (more specifically, the inclination of the surface of the biaser 28h to which the upper side 11b abuts against), in addition to the pressing force in the insertion direction (in a direction further into the insertion part 28S) of the flange 11a, a component force in a direction intersecting the insertion direction is also applied against the biaser 28h. Accordingly, in a state where the front frame molding 22 is attached, in addition to stability in the insertion/removal direction in which the engagement-receiving portion 11c is engaged with the engaging portion 28f, stability in the width direction of the clip 28 that intersects this insertion/removal direction can also be obtained by the biaser 28h, so that a greater effect in the positional precision of the front frame molding 22 can be obtained.

Although the present invention has been described based on the illustrated embodiment, the present invention is not limited thereto; various modifications are possible within the scope of the present invention. For example, as described in the illustrated embodiment, the clip 28, which is provided with one cantilever leaf spring biaser 28h, has a shape that facilitates the removal thereof upon being molded, thereby being advantageous with respect to productivity and manufacturing costs. However, it is possible to provide a plurality of biasers like that of the biaser 28h in order to provide a structure in which the retaining force of the front frame molding 22 is increased. Furthermore, instead of the cantilever shape like that of the biaser 28h, it is possible to also use a biaser having a shape so as to be connected at both ends thereof to the body of the clip 28. In such modifications, it is also desirable to set the biasing force of the biaser to within a range such that the ease of installation when attaching the front frame molding 22 is not hindered, as described above.

As described above, the present invention is not limited to the front frame molding 22 of the front side door 10, and can also be applied to the rear frame molding 122 of the rear side door 110. Furthermore, the present invention can be applied to a different kind of vehicle molding, providing that it has the fundamental structure of supporting a molding body onto an edge portion of a body part, of a vehicle, via a clip. The body part of a vehicle mentioned herein includes the concept of, in addition to a door panel of a door as in the illustrated embodiment, a design portion of a door frame, and a vehicle body to which a door is attached, and so on. For example, by providing a part(s) corresponding to the clip 28 on the belt moldings 21 and 121 of the illustrated embodiment, the same above-described effect can be achieved as that in the case of the front frame molding 22. Furthermore, the present invention can also be applied to the upper sash moldings 20 and 120 which are respectively attached to the upper frames 13 and 113. Furthermore, although not shown in the drawings, instead of a door trim molding, the present invention can also be applied to a body trim molding for an automobile (e.g., a roof molding).

INDUSTRIAL APPLICABILITY

As described in detail above, in the vehicle molding to which the present invention is applied, an elastically deformable biaser which abuts against an edge portion of a vehicle body part is provided in a clip, which is provided on an edge portion of a molding body, and applies a force which engages an engaging portion of the clip with an engagement-receiving portion of the body part by the restorative force of the biaser. Accordingly, the clip can be securely and reliably engaged onto the body part, thereby improving the ease of installation of the molding and the position precision in the attached state.

REFERENCE SIGNS LIST

10 Front side door
11 Door panel
11a Flange (edge portion of body part)
11b Upper side
11c Engagement-receiving portion
11d Support flange
11e Engagement hole
11N Outer panel (vehicle body part)
12 Rear side frame
13 Upper frame
14 Window opening
20 Upper sash molding
21 Belt molding
22 Front frame molding
23 First molding section
24 Second molding section
25 Corner portion
26 Design member (molding body)
26a Design portion
26b Vehicle-inner-side portion
26c Connecting portion
26d Retainer claws
26e Lip support
27 Holder member (molding body)
27a Weather strip retainer
28 Clip
28a Vehicle-outer-side portion (opposing portion)
28b Vehicle-inner-side portion (opposing portion)
28c Connecting portion
28d Abutting portion
28e Downward-extending portion
28f Engaging portion
28g Engagement hole
28h Biaser
28i Recess
28S Insertion part
29 Body-touch lip
32 Engagement hook
110 Rear side door
111 Door panel
112 Front side frame
113 Upper frame
114 Window opening
120 Upper sash molding
121 Belt molding
122 Rear frame molding

The invention claimed is:

1. A vehicle molding including a molding body extending along an edge portion of a body part of a vehicle and a clip which is provided on said molding body, wherein said vehicle molding is attached along said edge portion of said body part of said vehicle via said clip,
wherein said clip comprises:
an insertion part, into which said edge portion of said body part is inserted;
an engaging portion configured to engage with an engagement-receiving portion which is provided on said edge portion of said body part when said edge portion of said body part is inserted into said insertion part, whereby a movement of said edge portion of said body part is restricted in a removal direction which is opposite to a direction further into said insertion part; and
a biaser which elastically deforms upon abutting against said edge portion of said body part that is inserted into said insertion part, wherein said biaser being deformed exerts a restorative force against said edge portion of said body part, whereby an engagement of said engaging portion with said engagement-receiving portion is maintained, wherein said insertion part of said clip comprises 1) a pair of opposing portions, by which both sides of said edge portion of said body part are sandwiched and 2) a connecting portion which connects said pair of opposing portions and opposes an end of said edge portion of said body part, wherein said engaging portion is integrally formed on one of said pair of opposing portions, wherein said biaser comprises a cantilever shaped leaf spring which projects into said insertion part of said clip and which extends in a longitudinal direction of said molding body from a base end to a free end thereof, and wherein said base end of said biaser is connected to said connecting portion and said free end of said biaser is positioned in between said pair of opposing portions, wherein said biaser is elastically deformable in directions such that a position of said free end of said biaser approaches and moves away from said connecting portion.

2. The vehicle molding according to claim 1, wherein a gap is formed between said connecting portion and said edge portion of said body part in a state where said engaging portion is engaged with said engagement-receiving portion.

3. The vehicle molding according to claim 1, wherein said biaser has a cross-sectional shape which is inclined relative to a width direction of said clip from one to the other of said pair of opposing portions.

4. The vehicle molding according to claim 1, wherein said body part comprises a door panel of a vehicle door, wherein said molding body is attached to an edge portion of said door panel.

5. The vehicle molding according to claim 4, wherein said vehicle molding comprises a frame molding including a first molding section which is connected with a sash molding attached to a door frame of a vehicle door; a second molding section connected with a belt molding attached to said edge portion of said door panel; and a corner portion at which said first molding section and said second molding section meet, wherein said clip is provided on said second molding section.

6. The vehicle molding according to claim 3, wherein said biaser inclines, from a vehicle-interior side to a vehicle-exterior side, downward along said removal direction.

7. The vehicle molding according to claim 1, wherein one of said pair of opposing portions is provided with an engagement hole to which a retainer claw formed on said molding body engages.

8. The vehicle molding according to claim 1, wherein said clip is provided with a recess which is formed by cutting a part of at least one of said pair of opposing portions and a part of said connecting portion, and wherein said biaser projects, in said recess, from said connecting portion.

9. The vehicle molding according to claim 8, wherein
in said recess, said at least one of said pair of opposing portions has a part separated from an edge portion of said body part,
said at least one of said pair of opposing portions is provided with an abutting portion which abuts said edge portion of said body part, and
said abutting portion is formed at a position, on said at least one of said pair of opposing portions, downward from said recess in the removal direction.

* * * * *